United States Patent
Lee et al.

(10) Patent No.: US 6,761,956 B2
(45) Date of Patent: Jul. 13, 2004

(54) VENTILATED THERMAL BARRIER COATING

(75) Inventors: Ching-Pang Lee, Cincinnati, OH (US); Robert Edwards Schafrik, Cininnati, OH (US); Ramgopal Darolia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/028,108

(22) Filed: Dec. 20, 2001

(65) Prior Publication Data

US 2003/0115881 A1 Jun. 26, 2003

(51) Int. Cl.⁷ .............................. B32B 3/10; F03B 3/12
(52) U.S. Cl. ...................... 428/131; 428/632; 428/332; 428/596; 428/613; 428/137; 416/97 A; 416/97 R; 416/241 B; 60/752; 60/754
(58) Field of Search ................................. 428/632, 633, 428/596, 613, 650, 680, 469, 701, 332, 131, 137; 416/241 R, 241 B, 97 R, 97 A; 608/754, 770, 752, 753; 60/806

(56) References Cited

U.S. PATENT DOCUMENTS

| | | | |
|---|---|---|---|
| 5,271,967 A | 12/1993 | Kramer et al. | |
| 5,494,704 A | 2/1996 | Ackerman | |
| 5,503,874 A | 4/1996 | Ackerman et al. | |
| 5,780,110 A | 7/1998 | Schaeffer et al. | |
| 5,941,686 A | * 8/1999 | Gupta et al. | |
| 6,039,537 A | * 3/2000 | Scheurlen | |
| 6,210,488 B1 | * 4/2001 | Bruce | |
| 6,238,743 B1 | 5/2001 | Brooks | |
| 6,241,469 B1 | * 6/2001 | Beeck et al. | |
| 6,375,425 B1 | 4/2002 | Lee et al. | |
| 6,408,610 B1 | * 6/2002 | Caldwell et al. | |
| 6,478,535 B1 | * 11/2002 | Chung et al. | 415/115 |
| 6,511,762 B1 | * 1/2003 | Lee et al. | |

* cited by examiner

*Primary Examiner*—Jennifer McNeil
(74) *Attorney, Agent, or Firm*—David L. Narciso; Francis L. Conte

(57) ABSTRACT

A gas turbine engine component includes a perforate metal wall having pores extending therethrough. The wall has a first surface covered by a thermal barrier coating. The pores have first ends which are covered by the thermal barrier coating, and the pores are ventilated from an opposite second surface of the wall for cooling the thermal barrier coating.

22 Claims, 2 Drawing Sheets

VENTILATED THERMAL BARRIER COATING

BACKGROUND OF THE INVENTION

The present invention relates generally to gas turbine engines, and, more specifically, to heated components thereof.

In a gas turbine engine air is pressurized in a compressor and mixed with fuel in a combustor for generating hot combustion gases which flow downstream through an annular turbine nozzle and cooperating turbine stages which extract energy therefrom. The high pressure turbine nozzle includes a row of hollow vanes mounted in arcuate outer and inner bands and directs the combustion gases into a first stage high pressure turbine.

The turbine includes a row of hollow rotor blades mounted on a supporting rotor disk which is joined to the compressor for powering thereof during operation. A low pressure turbine follows the high pressure turbine and typically includes multiple stages of turbine rotor blades which extract additional energy from the combustion gases for typically powering a fan disposed upstream from the compressor. In this turbofan configuration of the gas turbine engine, the fan produces propulsion thrust for powering an aircraft in flight.

Since the combustor and turbine components are directly exposed to the hot combustion gases, they are typically cooled during operation by diverting a portion of the pressurized air from the compressor for use as a coolant channeled through these various hot components. Any air diverted from use in the combustion process decreases the overall efficiency of the engine and should be minimized. However, the hot engine components must be suitably cooled for ensuring a suitable useful life thereof.

Various cooling configurations are common for the combustor liners, turbine nozzle vanes, nozzle bands, turbine blades, turbine shrouds, as well as for exhaust liners for both commercial and military engines. These various cooling configurations include dedicated cooling channels, with various forms of cooling holes through which the cooling air is re-introduced into the combustion gas flowpath. Inclined film cooling holes are common in various ones of these engine components and provide internal convection cooling of the walls thereof, while also forming a protective cooling film of air along the exposed or outer surface of the wall which faces the hot combustion gases.

For additional protection from the hot combustion gases, the exposed outer walls of the hot engine components may be covered with a thermal barrier coating (TBC) which provides thermal insulation. The benefits of thermal barrier coatings are well known, and include enhanced performance and life of the gas turbine engine.

Typical thermal barrier coatings include ceramic material commonly requiring a corresponding metallic bond coating or layer firstly adhered to the metal surface of the engine components for in turn providing an improved bond with the thermal barrier coating. The TBC and cooperating bond coat layer ensure a strong bond thereof with the underlying metal substrate for ensuring the durability of the TBC for extended life in engine operation. In alternate developments, thermal barrier coatings may be applied to the metal substrate without a bond coat.

However, the durability of the TBC is affected by the operational temperature of its underlying support including the metal substrate and bond coating when used. As the bond coating experiences elevated temperature during operation, it is subject to temperature degradation thereof, and degradation of the bond coating weakens the TBC/bond coating interface and leads in turn to TBC spallation.

The ability to cool both the bond coating and the TBC thereatop is limited by the cooling configurations of the underlying metal substrate or wall. The component walls are typically relatively thin and cooled from their inner or back sides by channeling the cooling air thereover. The walls may also include the inclined film cooling holes which provide local internal convection cooling at each of the holes, in addition to providing the protective cooling air over the exposed or external surface of the component covered by the TBC.

Accordingly, it is desired to provide an improved thermal barrier coating system with enhanced cooling for enhancing the durability and life of the TBC during operation.

BRIEF SUMMARY OF THE INVENTION

A gas turbine engine component includes a perforate metal wall having pores extending therethrough. The wall has a first surface covered by a thermal barrier coating. The pores have first ends which are covered by the thermal barrier coating, and the pores are ventilated from an opposite second surface of the wall for cooling the thermal barrier coating.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
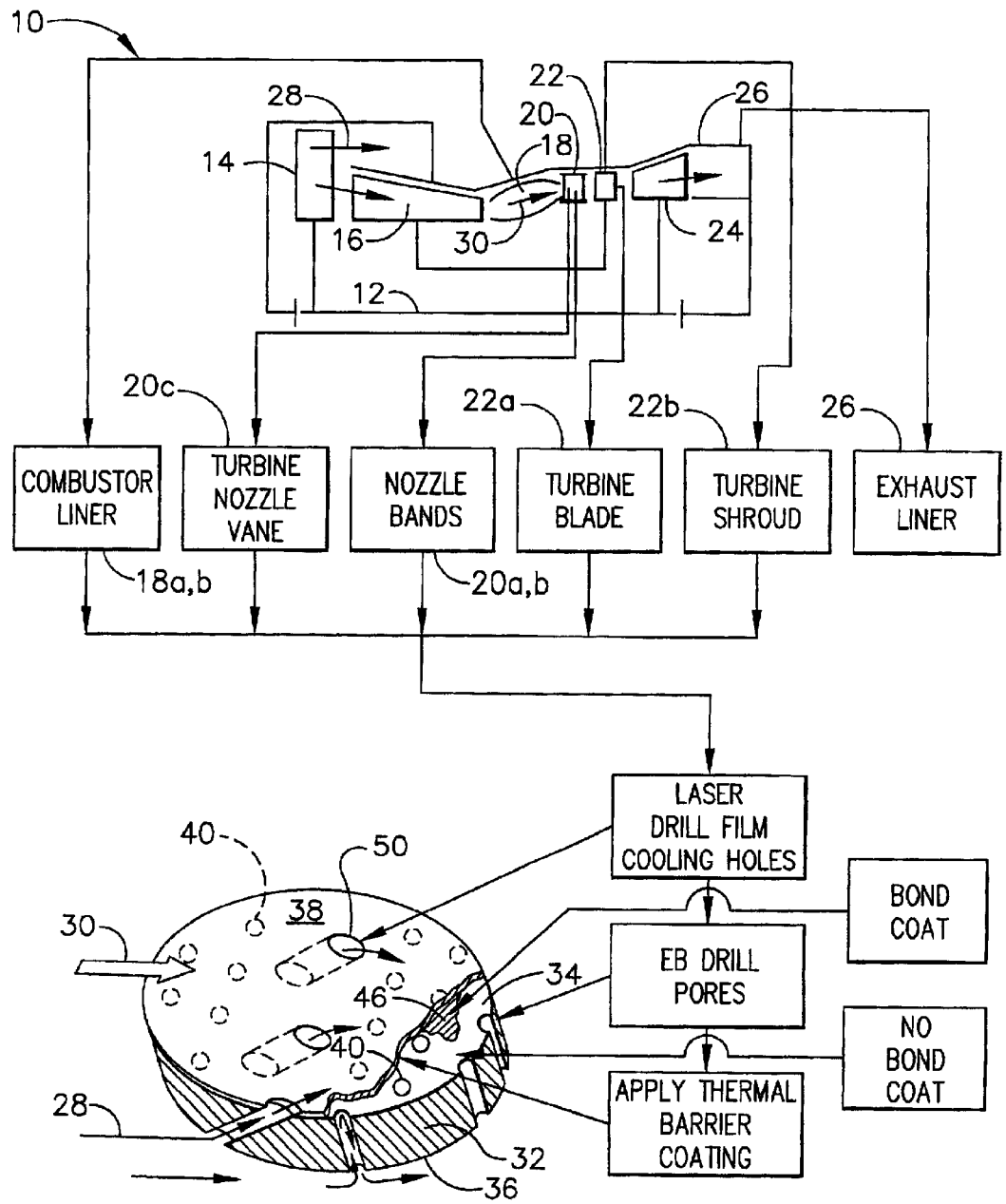
FIG. 1 is a schematic view of an exemplary turbofan gas turbine engine and corresponding flowchart for the production of ventilated thermal barrier coating on various hot components thereof in accordance with an exemplary embodiment of the present invention.

Illustrated schematically in FIG. 1 is an exemplary turbofan gas turbine engine 10 configured for powering an aircraft in flight. The engine is axisymmetrical about a longitudinal or axial centerline axis 12 and includes in serial flow communication a fan 14, multistage axial compressor 16, annular combustor 18, high pressure turbine nozzle 20, high pressure turbine 22, low pressure turbine 24, and an annular exhaust duct 26. The components may have any conventional configuration, with the high pressure turbine 22 powering the compressor 16 during operation, and the low pressure turbine 24 powering the fan 14.

During operation, ambient air 28 enters the inlet of the engine and flows past the fan 14, and an inner portion of the fan air is channeled through the compressor 16. The air is pressurized in the compressor and mixed with fuel in the combustor and ignited for generating hot combustion gases 30 which are discharged through the turbine nozzle 20 for driving the high and low pressure turbines for powering the compressor and fan in turn.

The combustor 18 may have any conventional form and typically includes annular outer and inner liners 18a,b which define an annular combustion chamber bounding the hot combustion gases during operation. A portion of the pressurized cooling air from the compressor is diverted therefrom and surrounds the outer liner 18a and inner liner 18b for providing cooling thereof during operation.

The high pressure turbine nozzle 20 may also have any conventional configuration and typically includes annular outer and inner bands 20a,b in the form of arcuate segments between which extend a row of corresponding nozzle vanes 20c. The vanes are hollow and provided with a portion of the compressor air channeled therethrough for cooling thereof during operation. And, cooling air from the compressor is also channeled over both the outer band 20a and inner band 20b for cooling thereof.

The high pressure turbine 22 may also have any conventional configuration and includes a row of turbine rotor blades 22a extending radially outwardly from a supporting rotor disk. The turbine blades are hollow and another portion of the compressor air is circulated therethrough for cooling thereof during operation.

Surrounding the row of high pressure turbine blades is annular turbine shroud 22b which maintains a relatively small clearance or gap with the blade tips during operation. The turbine shroud may also have any conventional configuration and is typically cooled from its outer surface by additional cooling air diverted from the compressor.

The low pressure turbine 24 includes corresponding rows of rotor blades and stator vanes with corresponding shrouds and nozzle bands which may also be cooled in any conventional manner.

The combustion gases are discharged from the low pressure turbine and exit the engine through the exhaust duct 26 which is typically in the form of a thin metal liner that bounds the combustion gases. In an augmented or afterburner configuration for a military turbofan engine, the exhaust liner is also cooled for protection against the hot combustion gases generated during reheat operation.

Since the engine described above includes various components which bound the hot combustion gases 30 during operation, they all share the common attributes of being formed with relatively thin substrates or walls 32 having exposed outer or first surfaces 34 over which flows the hot combustion gases 30 during operation, and opposite inner or second surfaces 36 over which flows the cooling air 28 during operation. In order to provide additional protection from the hot combustion gases, the exposed first surface 34 of the wall is covered by a thermal barrier coating (TBC) 38 in whole or in part as desired.

The wall 32 is shown in representative portion in FIG. 1 and may be introduced in any one or more of the combustor liners 18a,b; turbine nozzle vanes 20c; nozzle bands 20a,b; turbine blades 22a; turbine shroud 22b; and exhaust liner 26 as desired for particular configurations of the gas turbine engine. As indicated above, thermal barrier coatings are conventional in composition, application, and in use in various gas turbine engine components exposed to the hot combustion gases. The present invention is directed to an improved configuration of the TBC 38 cooperating with the substrate wall 32 in any of these exemplary engine components, or other components as desired or practical.

More specifically, the substrate wall 32 for the various engine components is typically a superalloy metal for its capability of withstanding the hot temperatures of operation. Typical superalloy metals for gas turbine engines include nickel or cobalt based superalloys, such as those commonly designated by the Rene' prefix designation.

In accordance with the present invention, the substrate wall 32 in any desired form, configuration, or application for the various engine components identified above is perforate or porous with a multitude of small holes or pores 40. The pores 40 are distributed and spaced apart from each other over the wall first surface 34 as illustrated in more detail in FIG. 2 wherever the TBC 38 is desired. As shown in FIG. 3, the pores 40 extend completely through the component wall 32 between the opposite surfaces 34,36 thereof and have corresponding first and second opposite pore ends 42,44, respectively.

Figure 2:
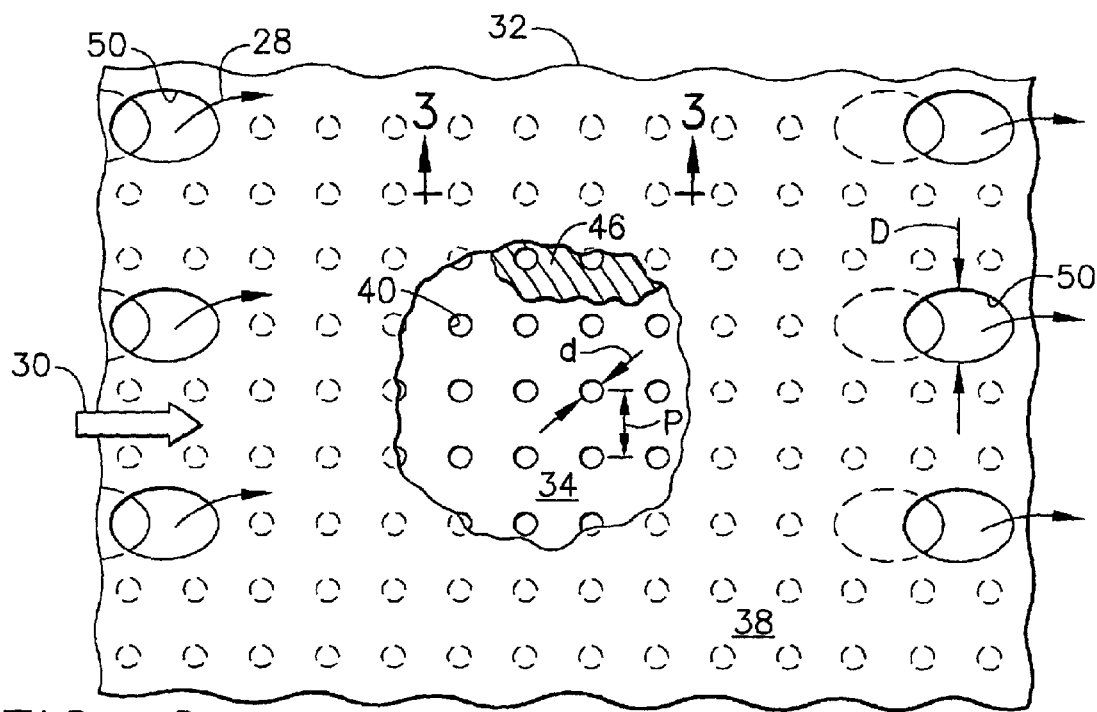
FIG. 2 is top view of a portion of a perforate wall representative of the various hot engine components illustrated in FIG. 1, including a multitude of small pores extending therethrough and covered by the thermal barrier coating.
Figure 3:
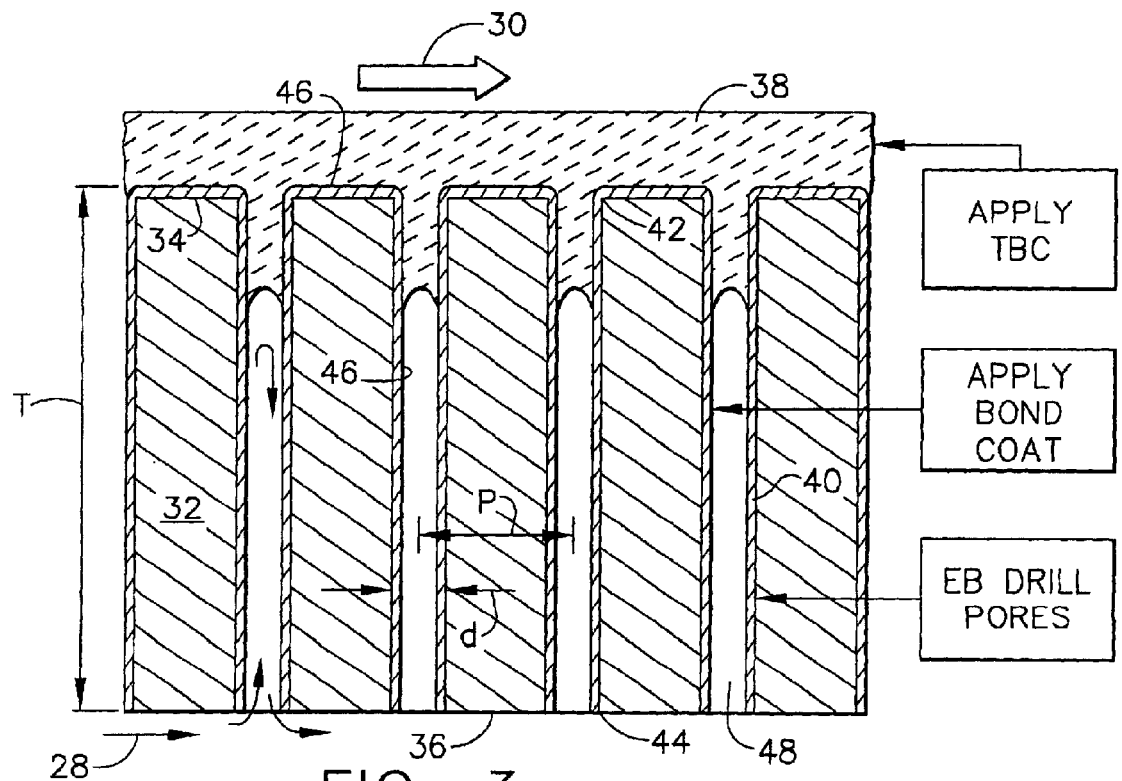
FIG. 3 is an elevational section view through a portion of the component wall illustrated in FIG. 2 and taken generally along line 3—3.

As shown in FIGS. 2 and 3, the TBC 38 covers the wall first surface 34 and also covers or overlays the corresponding outboard first ends 42 of the multitude of pores. In this way, a substantially smooth and continuous thermal barrier coating covers the wall first surface 34 and is additionally anchored thereto by the corresponding plugs or ligaments formed in the first ends 42 of the pores.

As additionally illustrated in FIGS. 2 and 3, a metallic bond coating 46 is preferably laminated between the wall first surface 34 and the TBC 38 for enhancing the bonding of the TBC to the metal substrate provided by the underlying wall. As indicated above, conventional thermal barrier coating is commonly used in conjunction with conventional bond coat layers for ensuring a durable bond between the TBC and the underlying parent metal. Similarly, the TBC 38 and the bond coating 46 may have any conventional composition for providing a good bond with the underlying metal substrate.

Although the thermal barrier coating is commonly used with a corresponding bond coating, current developments in TBC technology include the use thereof without bond coating. The durability of such no-bond-coat TBCs is still dependent on the temperature of the underlying metal substrate, and the temperature of the TBC and substrate interface.

Accordingly, the exemplary turbine components illustrated in FIG. 1 include the bond coating 46 in the interface between the TBC and metal substrate in the preferred embodiment, but in alternate embodiments those components may be devoid of bond coating in that interface.

However, the introduction of the multitude of pores 40 in the metal substrate provides substantial advantages in thermal performance and durability of the hot component wall, including in particular the thermal barrier coating thereon.

As illustrated schematically in FIG. 3, the multitude of small pores 40 are initially formed through the metal wall 32 using any suitable process such as electron beam (EB) drilling for which commercial equipment is presently available. The bond coating 46 may then be applied to cover the wall first surface 34 as well as lining the individual pores 40. The bond coating thusly extends inside the individual pores and preferably fully lines the pores between the opposite ends thereof.

Preferably, the bond coating may be formed using conventional diffusion aluminide processes. And, the bond coating may have any conventional composition including aluminide in the exemplary form of oxidation-resistant diffusion coating aluminide, platinum aluminide (PtAl), or nickel aluminide (NiAl).

The diffusion aluminide process applies the bond coat on the wall opposite first and second surfaces as well as lines the individual pores in one step or process. An overlay coating process such as physical vapor deposition or plasma spraying can be used to apply on the outer wall coating compositions designated MCrAlY, where M refers to iron, cobalt, and/or nickel in conventional compositions. In this case, a diffusion aluminide process can be used to apply coating inside the pores as well as over the inner wall.

The bond coating provides a bonding interface layer between the TBC and the metal substrate, and is oxidation-resistant. Since the life of the TBC is strongly dependent on the temperature capability of its underlying support including the bond coating and metal substrate, maintaining lower temperature of the TBC-substrate interface during operation correspondingly increases the useful life of the TBC.

Diffusion aluminide process for the bond coating illustrated in FIG. 3 ensures that the bond coating fully lines the individual pores 40 between their opposite first and second ends for providing an oxidation-resistant surface thereof. And then upon application of the TBC 38, the TBC extends partially inside the lined pores to effectively fill the corresponding first ends 42 thereof in a continuous thermal barrier coating over the wall first surface 34. Since the cooling air 28 is channeled over the opposite second surface 36 of the wall in flow communication with the corresponding second ends 44 of the pores, the TBC ligaments in the pore first ends seal the pores and prevent unintended leakage of the cooling air through the wall.

In this way, the TBC 38 may be used in its normal manner to cover the metal substrate and provide an aerodynamically smooth surface thereover without undesirable leakage of the cooling air through the multitude of pores. The TBC may have any conventional composition such as ceramic metal oxides including zirconia ($ZrO_2$) containing yttria ($Y_2O_3$) and magnesia (MgO) for example. In a preferred embodiment, the TBC 38 is in the form of yttria-stabilized zirconia (YSZ) forming a strong bond with the underlying aluminide bond coat layer. However, the introduction of the multitude of pores in the otherwise conventional bond coating system provides substantial advantages including the significant reduction in operating temperature of the bond coating itself for improving the useful life and durability of the TBC layer.

More specifically, and as illustrated in FIG. 3, the pores 40 remain open or unplugged at their inboard second ends 44 for providing flow communication with the cooling air 28 flowing over the wall inner second surface 36 during operation. The bond coating 46 illustrated in FIG. 3 is relatively thin and fully lines the individual pores, and forms an open channel 48 extending from the inboard second surface of the wall to the TBC 38 plugging the opposite outboard first ends 42 of the pores just below the outboard first surface 34 of the wall.

For example, the TBC may fill the top 10% or 20% of the full height or length of the pores, leaving open the bottom 80% or 90% of the individual pores. In this way, the cooling air 28 may enter the individual pores and provide internal convection cooling of the heated wall and, most significantly, also effectively ventilates and cools the back side of the TBC layer itself and the underlying bond coating 46. The operating temperature of the bond coating 46 may therefore be reduced for correspondingly increasing the useful life of the TBC itself.

The pores 40 illustrated in FIG. 3 preferably extend perpendicularly through the component wall 32, and therefore minimize the effective length of the pores and decrease the heat transfer path through the wall. In this way, as heat enters the wall through the TBC-side of the wall, the wall is simultaneously cooled by the cooling air on the back side of the wall which fills the corresponding pores from the back side thereof. In alternate embodiments, the pores could be inclined if advantageous.

As illustrated in FIG. 2, the pores 40 are preferably arranged in a uniform pattern equally spaced apart from each other at a pitch distance P center-to-center between the adjacent pores having small diameters d. The pores have a pitch-to-diameter ratio P/d within a range of about two to ten, with a preferred ratio of about three.

The pore diameter d is as small as practical and may be up to about ten mils, or about 250 microns, which is readily formed by the electron beam drilling process commercially available. In view of the small pore size and close spacing thereof, a multitude of the tiny pores are generated over the surface of the component wall for typical gas turbine engine components. The thickness T of the component wall may be up to about 80 mils, 2 mm, in an exemplary embodiment for gas turbine engine components, with the individual pores therefore having a large length-to-diameter ratio of about eight.

Since the diameter of the individual pores may be about five mils (100 microns), the thickness of the bond coating 46 may be about one to two mils, 25–50 microns, for preventing plugging of the pores with the bond coating itself. And then, the TBC may be applied over the component wall in a thickness of about five to ten mils, 0.1–0.2 mm, with slight plugging of the outboard ends of the bond coating lined pores.

Although the component wall is perforate with the introduction of the through pores 40 therein, the application of the TBC 38 covers the entire first surface 34 of the component wall to provide a flow boundary for the hot combustion gases and prevent unintended leakage of the cooling air through the pores. This relatively simple construction enjoys substantial benefits.

For example, the TBC layer 38 is ventilated by the cooling air introduced at its back side through the multitude of pores. The pores provide additional bonding area for retaining the TBC and the bond coating. The pores themselves provide internal surface area not otherwise possible which substantially increases the effective cooling area of the component wall itself.

The inlet ends of the pores along the wall inner surface 36 provide local interruptions in the continuity thereof and generate turbulence as the cooling air 28 flows thereover during operation. In this way, the back side of the component wall itself enjoys improved cooling; the component wall is internally cooled by the open channels 48 provided by the pores; and the bond coating and TBC are back-side cooled.

Analytical studies of this design show a substantial reduction in temperature of the component wall itself, with corresponding reduction in temperature of the bond coating and overlying TBC. These lower temperatures should improve the useful life of the component wall and the TBC provided thereover.

An additional advantage of the porous component wall covered by the TBC is that cracking in the TBC which may occur during operation may be arrested or stopped at individual pores in the vicinity of the cracks. And, if the crack extends into the corresponding pores, cooling air may then leak through the crack and provide additional local cooling of the cracked TBC for reducing degradation thereof. Since the pores are minute in size, any airflow leakage at such cracks will be negligible and will not adversely affect operation of the engine.

But for the ventilated thermal barrier coating system disclosed above, the component wall may have any conventional configuration for use in the various hot components of the engine.

For example, illustrated in FIGS. 1 and 2 are a plurality of inclined film cooling holes 50 extending through the component wall 32 and the TBC thereon. The film cooling holes may have any conventional configuration, and typically are small diameter D cylindrical holes inclined at an acute angle through the wall for forming elliptical inlets and outlets on the opposite surfaces of the wall.

The multitude of pores 40 are minute in size and substantially smaller than the corresponding film cooling holes 50. For example, the preferred diameter d of the pores is about five mils whereas the typical diameter D of the film cooling holes 50 is about 15 to 20 mils. Whereas the film cooling holes are specifically sized and spaced apart in pitch to provide a film cooling layer over the outer surface of the component wall, the multitude of pores 40 are sized and closely spaced apart for providing effective back-side cooling of the bond coating and thermal barrier coating.

The pattern of the pores is selected to ensure a significant reduction in average temperature of the metal substrate and the bond coating without excessively hot spots in the temperature of the TBC-substrate interface between pores for increasing the useful life of the TBC by effective cooling. Since the film cooling holes 50 are relatively large and spaced relatively wide apart, they alone are insufficient for reducing the temperature of the TBC-substrate interface including the bond coating thereat for achieving the increase in useful life attributable to the use of the pores.

The introduction of the pores for back-side ventilation and cooling of the bond and thermal barrier coatings enjoys the many benefits described above, as well as reducing the overall weight of the component. Since the introduction of the pores corresponds with an increase in manufacturing cost of the component wall, the ventilated TBC may be selectively used in only those components requiring the enhanced durability and life of the TBC. And, the ventilated TBC may be limited in use to selected portions of the individual components which are subject to locally high heat loads. For example, the ventilated TBC may be applied only to the leading and trailing edges of turbine rotor blades, or their tip regions, or portions of their pressure sides as just examples of regions subject to locally high heat loads.

The actual location and configuration of the ventilated TBC may be determined by the particular requirements of the particular gas turbine engine component requiring protection from the hot combustion gases flowable thereover. Typical gas turbine engine components which may enjoy improved life of the TBC include the combustor liners, turbine nozzle vanes, nozzle bands, turbine rotor blades, turbine shrouds, and exhaust liner described above. And, other applications for the use of the ventilated TBC may enjoy the benefits thereof as desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

What is claimed is:

1. A gas turbine engine component comprising a perforate metal wall having a multitude of pores covered and sealed closed at first ends thereof by a thermal barrier coating disposed over a first surface of said wall, a plurality of film cooling holes extending through said wall and thermal barrier coating, and said pores being minute in diameter size and closely spaced together in surface area in a substantially uniform pattern over said wall for reducing average temperature of the interface between said wall and said thermal barrier coating.

2. A component according to claim 1 wherein said pores are open at opposite second ends thereof along an opposite second surface of said wall.

3. A component according to claim 2 devoid of a bond coating laminated between said wall first surface and said thermal barrier coating.

4. A component according to claim 2 further comprising a bond coating laminated between said wall first surface and said thermal barrier coating.

5. A component according to claim 4 wherein said bond coating extends inside said pores.

6. A component according to claim 5 wherein said bond coating lines said pores, and said thermal barrier coating extends inside said bond coating lined pores.

7. A component according to claim 6 wherein said bond coating fully lines said pores between said first and second ends and forms an open channel extending from said second surface to said thermal barrier coating covering said pore first ends below said first surface.

8. A component according to claim 7 wherein said pores extend perpendicularly through said wall.

9. A component according to claim 6 wherein said pores extend perpendicularly through said wall.

10. A component according to claim 6 wherein said pores are arranged in a uniform pattern having a pitch-to-diameter ratio within a range of about two to ten.

11. A component according to claim 10 wherein said pores have a diameter up to about 250 microns.

12. A component according to claim 6 wherein said pores are smaller than said film cooling holes.

13. A component according to claim 6 wherein said bond coating comprises aluminide.

14. A component according to claim 13 wherein said thermal barrier coating comprises yttria-stabilized zirconia.

15. A gas turbine engine combustor liner comprising:
a metal wall having opposite first and second surfaces and a multitude of pores extending through said wall between opposite first and second ends of said pores;
a bond coating covering said first surface and lining said pores;
a thermal barrier coating covering said bond coating along said first surface and covering and sealing closed said pore first ends, with said pore second ends remaining open, and said pores being minute in diameter size and closely spaced together in surface area in a substantially uniform pattern over said wall for reducing average temperature of the interface between said wall and said thermal barrier coating; and
a plurality of film cooling holes extending through said wall and thermal barrier coating.

16. A turbine nozzle vane comprising:
a metal wall having opposite first and second surfaces and a multitude of pores extending through said wall between opposite first and second ends of said pores;
a bond coating covering said first surface and lining said pores;

a thermal barrier coating covering said bond coating along said first surface and covering and sealing closed said pore first ends, with said pore second ends remaining open, and said pores being minute in diameter size and closely spaced together in surface area in a substantially uniform pattern over said wall for reducing average temperature of the interface between said wall and said thermal barrier coating; and a plurality of film cooling holes extending through said wall and thermal barrier coating.

17. A turbine nozzle band comprising:

a metal wall having opposite first and second surfaces and a multitude of pores extending through said wall between opposite first and second ends of said pores;

a bond coating covering said first surface and lining said pores;

a thermal barrier coating covering said bond coating along said first surface and covering and sealing closed said pore first ends, with said pore second ends remaining open, and said pores being minute in diameter size and closely spaced together in surface area in a substantially uniform pattern over said wall for reducing average temperature of the interface between said wall and said thermal barrier coating; and a plurality of film cooling holes extending through said wall and thermal barrier coating.

18. A turbine blade comprising:

a metal wall having opposite first and second surfaces and a multitude of pores extending through said wall between opposite first and second ends of said pores;

a bond coating covering said first surface and lining said pores; end a thermal barrier coating covering said bond coating along said first surface and covering and sealing closed said pore first ends, with said pore second ends remaining open, and said pores being minute in diameter size and closely spaced together in surface area in a substantially uniform pattern over said wall for reducing average temperature of the interface between said wall and said thermal barrier coating; and a plurality of film cooling holes extending through said wall and thermal barrier coating.

19. A turbine shroud comprising:

a metal wall having opposite first and second surfaces and a multitude of pores extending through said wall between opposite first and second ends of said pores;

a bond coating covering said first surface and lining said pores;

a thermal barrier coating covering said bond coating along said first surface and covering and sealing closed said pore first ends, with said pore second ends remaining open, and said pores being minute in diameter size and closely spaced together in surface area in a substantially uniform pattern over said wall for reducing average temperature of the interface between said wall and said thermal barrier coating; and a plurality of film cooling holes extending through said wall and thermal barrier coating.

20. A gas turbine engine exhaust liner comprising:

a metal wall having opposite first and second surfaces and a multitude of pores extending through said wall between opposite first and second ends of said pores;

a bond coating covering said first surface and lining said pores;

a thermal barrier coating covering said bond coating alone said first surface and covering and sealing closed said pore first ends, with said pore second ends remaining open, and said pores being minute in diameter size and closely spaced together in surface area in a substantially uniform pattern over said wall for reducing average temperature of the interface between said wall and said thermal barrier coating; and a plurality of film cooling holes extending through said wall and thermal barrier coating.

21. A gas turbine engine component comprising a perforate metal wall having a multitude of minute pores covered and sealed closed at first ends thereof by a thermal barrier coating disposed over a first surface of said wall, and a plurality of film cooling boles extending through said wall and thermal barrier coating.

22. A component according to claim 21 wherein said pores are smaller and greater in number than said film cooling holes.

* * * * *